(12) United States Patent
Erb et al.

(10) Patent No.: US 6,315,303 B1
(45) Date of Patent: Nov. 13, 2001

(54) METALLIC FLAT SEAL

(75) Inventors: Wilfred Erb; Ralf Göttel, both of Neu-Ulm; Franz Hieble, Senden; Kurt Höhe, Langenau; Hans Katzmaier, Beimerstetten; Alexander Kögel, Neu-Ulm; Thierry Lebailly; Josef Ludwig, both of Niederstotzingen; Bernhard Obermeier, Kissendorf; Edwin Puscher, Senden, all of (DE); Dominique Tasch, Versaille (FR); Günther Unseld, Neenstetten (DE); Hans-Dieter Waltenberg; Alfred Weiss, both of Neu-Ulm (DE); Frank Popielas, Senden (DE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/331,531

(22) PCT Filed: Dec. 23, 1997

(86) PCT No.: PCT/EP97/07263

§ 371 Date: Sep. 21, 1999

§ 102(e) Date: Sep. 21, 1999

(87) PCT Pub. No.: WO98/28559

PCT Pub. Date: Jul. 2, 1998

(30) Foreign Application Priority Data

Dec. 24, 1996 (DE) .............................................. 196 54 283

(51) Int. Cl.[7] .................................................... F02F 11/00
(52) U.S. Cl. ........................................ 277/593; 277/600
(58) Field of Search .................................. 277/593, 594, 277/595, 596, 600, 604

(56) References Cited

U.S. PATENT DOCUMENTS

| | | | |
|---|---|---|---|
| 4,799,695 | * 1/1989 | Yoshino | ........................... 277/593 X |
| 5,286,039 | * 2/1994 | Kawaguchi et al. | ................. 277/593 |
| 5,490,681 | * 2/1996 | Plunkett et al. | ................. 277/596 X |
| 5,588,657 | * 12/1996 | Fujisawa et al. | ..................... 277/595 |
| 5,669,615 | 9/1997 | Höhe et al. . | |

FOREIGN PATENT DOCUMENTS

| | | |
|---|---|---|
| G 94 14 941.0 | 12/1994 | (DE) . |
| 0 468 654 | 1/1992 | (EP) . |
| 0 780 561 | 6/1997 | (EP) . |

OTHER PUBLICATIONS

Patent Abstracts of Japan, Application No. 02118373, Application Date May 8, 1990, Applicant Japan Metal Gasket Co Ltd. Entitled "Metal Gasket".

(List continued on next page.)

Primary Examiner—Robert J. Sandy
Assistant Examiner—Karlena D. Schwing
(74) Attorney, Agent, or Firm—Rader, Fishman & Grauer PLLC

(57) ABSTRACT

A gasket is provided that is suitable for use in connection with a cylinder head. The gasket includes a first outer plate including a compensating portion, a second outer plate including a compensating portion, and a compensating plate positioned between said first and second outer plates. Preferably, at least one of said first and second outer plates includes a bead positioned outside of, and in close proximity to, said compensation portion of said plate. The compensating plate includes a compensating element and an edge portion. In a preferred embodiment, the area between the compensating portions of said first and second outer plates defines a compensating area and said compensating element is positioned within said compensating area. If desired, the gasket may also include a spacer plate.

20 Claims, 11 Drawing Sheets

OTHER PUBLICATIONS

Patent Abstracts of Japan, Application No. 62233965, Application Date Sep. 18, 1987, Applicant Nippon Metal Gasket KK Entitled "Laminated Metal Gasket".

*MTZ Motortechnische Zeitschrift* 55 (1994) Article Entitled Neue Mehrlagen–Metall–Zylinderkopfdichtungen, by Von Peter Grosch and Josef Lugwig (pp. 62–67).

* cited by examiner

METALLIC FLAT SEAL

FIELD OF THE INVENTION

The present invention generally relates to gaskets. More specifically, the present invention relates to multi-layered gaskets that are suitable for use in connection with a cylinder head.

BACKGROUND OF THE INVENTION

In the technical field of cylinder head gaskets, the gasket constructions containing soft material have been increasingly replaced in recent years by gaskets substantially formed of sheet metal plates. One reason for this development is that the asbestos material usually used in conventional soft material gaskets is no longer used because of health and environmental reasons. Additionally, the suitability of soft material gasket constructions for modern high duty engines, i.e., engines charged with a turbo-supercharger, is subject to limitations because of their low durability and elasticity. Finally, metallic gaskets provide advantages over soft material gaskets also in view of disposal and recycling.

Metallic flat gaskets for combustion engines of today usually consist of laminates being composed of a plurality of layers of sheet metal plates. One problem of these gaskets is that due to the punctual introduction of the screw forces in the built-in condition, the cylinder head and cylinder block tend to warp so that the distance between cylinder head and cylinder block in the area of the combustion chamber holes is larger than in the area of the cylinder head screws. This problem occurs in particular with aluminum cylinder heads nowadays increasingly us ed in engine construction which have a lower material stiffness compared to the cylinder heads made of gray cast iron material. Accordingly, a simple laminate made of different layers of sheet metal plates does not result in satisfying sealing conditions because of its relatively low deformability and elasticity as compared to soft material gaskets.

Metallic gaskets most often contain elastic means in the area of the through holes to counter this problem. In general, these means are half-beads, beads or edgings in the sheet metal plates of the laminate, resulting in a linear elastic sealing around the through holes.

Another problem is that the gap to be sealed between cylinder head and cylinder block of a combustion engine is oscillating because of the fast pressure and temperature changes, and therefore the gasket is subjected to constantly changing pressures ("beating") particularly in the area of the combustion chamber holes. This effect reduces the durability of elastic means, e.g. beads, arranged around the cylinder through holes.

In EP-A-0 230 804, a generic metallic flat gasket containing a compensating plate within the sheet metal laminate is described. In the area of the gasket confining the sealing gap towards the combustion chamber, the edge of the compensating plate is folded back completely onto itself or onto an intermediate plate, thereby forming a compensating means or stopper. The formation of the stopper results in a compensating area within the laminate which is characterized by an overall greater thickness of the different layers compared to the rest of the gasket. The enlarged gap in the area of the combustion chamber holes caused by the screw torque is compensated by the stopper or the compensating area.

Additionally, the gaskets of EP-A-0 230 804 have an elastic outer plate having a bead, the bead being arranged adjacent to the compensating area around the combustion chamber hole.

With the above-mentioned gaskets an elastic sealing line is only obtained in the area of the beads of the outer plates outside the compensating area. In the fastened position of the gasket, the compensating area with the stopper prevents the complete flattening of the beads. However, in view of its function as a first sealing line, it offers no elasticity.

Accordingly, the bead of the outer plate may be exposed to combustion gases and residues when the beating effect occurs, which may adversely affect its sealing function. Accordingly, high screw forces or stopper projections need to be applied to minimize the beating effect, which may cause unwanted warping of the engine parts.

From the German utility model G 94 14 941, a further generic flat gasket is known. The gaskets described therein contain pre-edged intermediate plates having an elasticity due to the edgings. The edgings are located in the area of the beads of the beaded outer plates. Accordingly, the sealing lines that build up within the laminate after mounting of the gasket are not concentrating in defined functionally separated areas, but are distributed over different areas of the laminate.

Accordingly, one object of the present invention is to avoid the disadvantages of the prior art stated above. A further object is to provide metallic flat gaskets which achieve satisfying sealing characteristics in spite of their simple construction.

These and other objects are solved by the features of claim 1 and the depending claims.

The gaskets according to the present invention are metallic flat gaskets. This does not exclude that the gaskets comprise soft coatings, e.g. to enhance sealing properties. These coatings may be polymer coatings which are normally used for these purposes. Furthermore, the gaskets may contain elastomeric sealing elements at certain positions, for example rubber pads, e.g. for sealing of through holes for a cooling or lubricating liquid.

The gaskets according to the present invention are laminates made of layers of different sheet metal plates. Such laminates may comprise, for example, different sheets that are connected with each other by bordering of the edges of the sheets. The laminate may also be obtained by simply stacking different sheet metal plates on top of each other. The individual sheets of the laminate are then preferably held together by metal eyelets or by rivetting, clinching, gluing or welding. However, it is also possible to obtain the gasket laminate by stacking the individual plates on top of each other only during the mounting of the gasket. In this case, the alignment of the plates is done, for example, with the help of the cylinder bolts or fixing pins. The term "sheet metal plates" used in connection with the present invention also includes elements of the gasket laminate such as bordered metal sheets, metal rings (optionally beaded) or spring rings.

SUMMARY OF THE INVENTION

The gaskets according to the present invention comprise a compensating area around the combustion chamber hole, or in the case of gaskets for engines with several cylinders, around the combustion chamber holes. Compensating area means the area of the laminate in which the sum of the thickness of the different layers of sheet metal plates is greater than in the remaining portion of the gasket laminate, which does not exclude that, for example, metal eyelets or rivets holding the laminate together have a thickness corresponding to that of the compensating area, or having a thickness even exceeding that, as long as they are in a non-pressed area of the gasket. Also, this does not exclude that adjacent metal layers in the compensating area of the laminate are not in direct contact with each other. A compensation of the enlarged width of the gap in the area of the combustion chamber hole, which is caused by the screw forces, is achieved after mounting of the gasket due to the fact that the gasket has the greatest metal layer thickness in the area of the compensating area.

In a preferred embodiment all sheet metal plates of the laminate take part in the formation of the compensating area. This means that in the area of the combustion chamber hole, the edge portions of all sheet metal plates taking part in the formation of the laminate are located within the compensating area of the laminate. In another advantageous embodiment it is also possible that the edge portions of specific sheet metal plates of the laminate being arranged around the combustion chamber hole do not extend into the compensating area.

A gasket according to the present invention comprises a compensating plate and a compensating means. In a preferred embodiment, the compensating plate is provided with the compensating means. Preferably, the compensating plate takes part in the formation of the compensating means with an edge portion located within the compensating area. It is also advantageous to form the compensating means entirely out of the compensating plate. In these cases, it is preferred to use a compensating plate made of an elastic material, e.g. spring steel, which has good resilient properties. It is also possible, however, that the compensating means is a part of the gasket which is different from the compensating plate. In this case, a part attached to the compensating plate by soldering, welding, gluing or calking is advantageous, which part may then serve as compensating means. In this case, the compensating plate does not necessarily have to contribute to the formation of the compensating means, and may be reduced to a portion not located within the compensating area of the laminate. It is then not necessarily required that the material of the compensating plate is elastic and has resilient properties.

The compensating means has a layer thickness which is greater than the layer thickness of the compensating plate as determined in the area outside the compensating area of the laminate. In other words, the compensating means has a greater layer thickness than the part of the compensating plate which is not located within the compensating area of the laminate. The increased layer thickness of the compensating means may be achieved, for example, by bordering the edge portion of the compensating plate located within the compensating area of the laminate, the edge portion not necessarily coming into direct contact with the sheet onto which it is folded back by virtue of the bordering. Preferably, at least a part of the folded back edge portion is not in contact with this sheet after bordering. The plate onto which the edge portion has been folded back is either the compensating plate or a spacer plate. However, an advantageous embodiment may also be obtained when the folded back edge portion located within the compensating area is in complete contact with the compensating plate or the spacer plate onto which it has been folded back over its entire length.

A compensating means having the necessary increased layer thickness may also be formed by an enlargement of the edge portion of the compensating plate located within the compensating area of the laminate. Such an enlargement may be made, for example, by placing a metal shim onto the compensating plate, the metal shim being firmly connected to the compensating plate, for example, by soldering, welding, gluing or calking, and being in contact with the compensating plate over its entire surface. An enlargement may also be achieved in a simple manner by stamping the compensating plate. It is also possible to achieve a small enlargement of the compensating plate by spraying a metal layer onto it.

The compensating means may, however, also be obtained by a metal shim being attached to the compensating plate which is not in contact with the compensating plate over its entire surface. Preferably, a metal shim is used in this regard which is made of a material that is elastic and has good resilient properties. An advantageous embodiment is obtained when a bordered plate is used as the metal shim. In this case, it is not necessarily required to fix the metal ring additionally to the compensating plate. In order to facilitate the mounting and fixing of the metal shims within the compensating area, the compensating plate may be provided with recesses adapted to the shape of the metal shims, e.g. by stamping of the edge portion of the compensating plate located within the compensating area.

As mentioned above, the compensating means may also be entirely formed out of a separate part of the gasket. In this case, the compensating plate does not take part in the formation of the compensating means or the compensating area. Preferable in this case is, for example, a spring ring welded to the compensating plate that has an overall enlarged layer thickness compared to the portion of the compensating plate not located within the compensating area. If the metal shim used as compensating means, e.g. a spring ring or a beaded elastic ring, is arranged within the laminate between two metal sheets, e.g. between two beaded outer plates, it is also possible not to connect the metal shim with the part of the compensating plate which is located outside the compensating area. In this case, the compensating plate has no support function for the compensating means but serves merely to adjust the overall thickness of the portion of the laminate located outside the compensating area by means of the chosen sheet thickness so that the overall layer thickness is smaller than in the compensating area.

The compensating means is located within the compensating area of the laminate. The compensating area of the laminate extends away from the combustion chamber hole towards the end of the compensating means. This means that its beginning on its side averted from the combustion chamber is defined by the compensating means. The compensating means contributes to the sum of the thickness of the different layers within the compensating area being greater than within the remaining part of the laminate. It is also conceivable that the enlarged thickness within the compensating area is provided by more than one compensating plate having compensating means. The use of a single compensating plate, or compensating means, is preferred.

The gaskets according to the present invention furthermore contain at least one elastic outer plate having a bead located close to the compensating area of the laminate. After mounting of the gasket, the bead in the outer plate forms a second elastic sealing line which is protected by the first sealing line formed by means of the compensating area of the laminate.

The elastic outer plate is preferably an elastic steel, e.g. spring steel. The bead formed in the outer plate close to the compensating area around the combustion chamber may be a closed bead (full bead) or, if needed, an open bead (half-bead). The bead in the outer plate may be in contact with the cylinder head or the cylinder block with its basis.

It is, however, also possible that the cylinder block or the cylinder head are in contact with the vertex of the bead after the mounting of the gasket. If two beaded outer plates are used, the beads thereof may be arranged in parallel as well as in opposite orientation relative to the bead of the other outer plate. When using two beaded outer plates, the beads are preferably opposite to each other, i.e., each has the same distance to the compensating area of the gasket. The outer plates may contain several beads. However, the use of only one bead each is preferred.

The edge portion of the beaded elastic outer plate is arranged within the compensating area of the laminate and contributes to the formation of this area. In a preferred embodiment, the edge portion is not covered by another sheet metal plate of the laminate towards the outside, i.e., towards the cylinder head or cylinder block, e.g. by bordering. However, other preferred embodiments of the present invention comprise also gaskets having the edge of one metal plate of the laminate bordered such that the edge portion of the beaded elastic outer plate is covered towards the cylinder head or the cylinder block by this bordered edge.

The gaskets according to the present invention may comprise spacer plates in addition to a compensating plate and one or more elastic outer plates. Such spacer plates contribute to the formation of thickness of the laminate of the gasket. They are particularly useful to compensate different overall constructive hights which may become relevant when replacing soft material gaskets by metal gaskets.

According to the present invention, the compensating means within the compensating area of the laminate is provided with elastic means. In case the compensating means is formed by bordering the edge portion of the compensating plate, an elastic means is obtained in that at least a part of the bordered edge portion is not in contact with the portion of the compensating plate or the spacer plate. For this purpose, the material of the compensating plate should preferably be made of an elastic, resilient material.

In a preferred embodiment, the bordering is done such that the bordered edge portion is forming a cavity with the portion of the compensating plate onto which the edge portion is folded back, the cavity having approximately the shape of an α. By choosing an elastic material for the compensating plate, the plate surrounding the α-shaped cavity acts as a spring and provides the desired elasticity to the compensating area.

It is also advantageous to provide the compensating means obtained by bordering with additional beads or edgings, whereby the elastic properties are enhanced. In case no α-shaped cavity is formed by the bordering, the introduction of beads, or half-beads, or edgings into the compensating means is preferred to obtain the desired elasticity, unless an inlay made of an elastic sealing material is included into the bordering. Suitable as such an inlay made of elastic sealing material are, for example, composite material, expanded graphite foil, mica folium or a temperature resistant elastomer or resin.

When the compensating means is formed by an enlargement of the edge portion of the compensating plate located within the compensating area of the laminate, the elastic means may be formed in that the enlarged edge portion is provided with a bead (including a half-bead) or an edging. The bead or edging provides the compensating area with the desired elasticity. Accordingly, in these embodiments an elastic plate, e.g. an elastic steel such as spring steel, is preferably used for the compensating plate. The desired elasticity may, however, also advantageously be achieved by choosing a welded or soldered metal shim made of an elastic material, which is in contact with the edge portion of the outer plate with its entire surface and contributes to the enlargement.

If the compensating means is formed by a metal shim, with either the compensating plate taking part in the formation of the compensating means by an edge portion located within the compensating area or with the compensating means being formed by a separate metal shim attached or not attached to the compensating plate, an elastic means may be obtained within the compensating means in that the metal shim is made of an elastic material and is provided with beads. If a spring ring is used as compensating means, the use of additional beads is not necessarily required for the desired elasticity in the compensating area. However, also in this case it is preferred to provide the outermost layers of the multiply folded spring ring with beads.

In addition to the above-mentioned spacer plates, or instead thereof, the metallic flat gaskets according to the present invention may further contain a spacer plate which is also provided with an elastic means within its edge portion located within the area of the combustion chamber holes. This elastic means may also be beads (including half-beads) and edgings. The above-referenced edge portion of the spacer plate provided with an elastic means is in this case not necessarily limited to the compensating area of the laminate. For instance, in a preferred embodiment an edging introduced into the edge portion of the spacer plate is located outside the compensating area of the laminate. The edge portion of the spacer plate provided with elastic means does not, however, extend in the direction opposite to the combustion chamber hole beyond the area of the beads of the outer plates. In preferred embodiments of the present invention, the spacer plate is free of elastic means in the area of the beads of the outer plates. If the elastic means are beads or edgings, a material is preferably chosen for the spacer plate that has a certain elasticity. However, the required elasticity may already be obtained in this case by softer sheets, such as a copper sheet.

As the elastic means with which the above-mentioned edge portion of the spacer plate is provided, a layer made of elastomeric sealing material may also be used. It is also advantageous to provide the spacer plate with a spring ring, preferably provided with a bead in the two outer sheet layers.

The metallic flat gaskets according to the present invention may also contain a spacer plate provided with a plastically deformable means in the above-mentioned edge portion. Suitable as such means is, for instance, an undulating profile, e.g. formed by V-shaped grooves, provided on both sides of a spacer plate made of deformable material, with the distance of the peaks lying opposite to each other on the different sides of the spacer plates, and being formed by the V-shaped grooves, being greater than the thickness of the spacer plate outside the edge portion. Depending on the shape of the V-shaped grooves, the deformability of the plastic means may to a certain extent also have elastic characteristics.

The metallic flat gaskets according to the present invention may also contain a spacer plate which is provided with plastically-elastically deformable means in the above-mentioned edge portion. Suitable as such means are, for example, beads that provide elasticity to the edge portion of the spacer plate and have at their bases and verteces plastically deformable bulbs, or enlargements, in the area of which the plate thickness of the spacer plate is greater than the layer thickness outside the edge portion of the spacer plate.

In the following, the invention is described in more detail with the help of examples shown in drawings.

Figure 1:
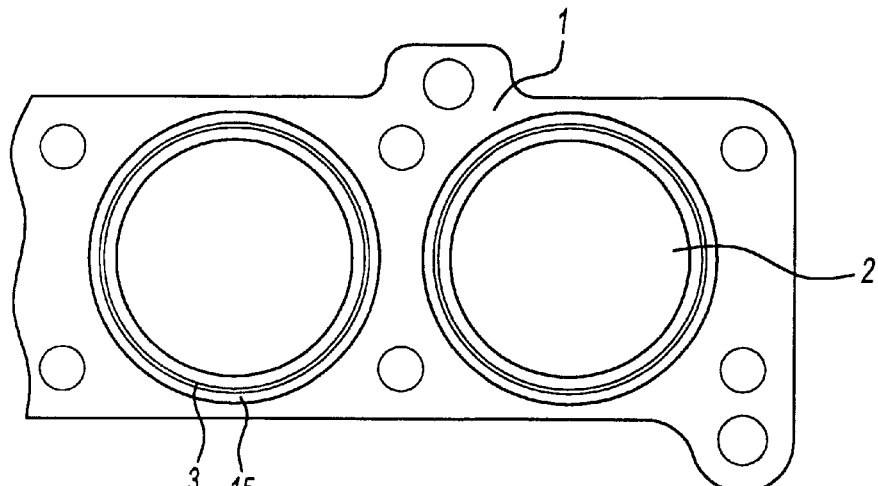
FIG. 1 shows a top view of a portion of a flat gasket.

FIG. 1 shows a top view of a cylinder head gasket 1 according to the present invention. Such a gasket comprises inter alia a combustion chamber hole 2 surrounded by a compensating area 3 which in the mounted condition confines the gap between the cylinder head and the cylinder block towards the combustion chamber. Immediately adjacent to the compensating area 3, however not overlapping with this area, a second elastic sealing area is located that is formed by a bead 15.

Figure 2:
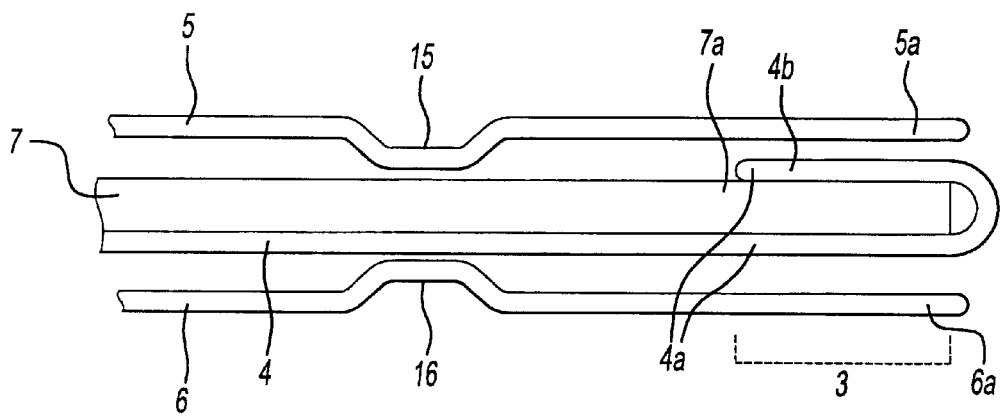
FIG. 2 shows a cross-section of a cylinder head gasket according to the prior art.

A cross-section in the area of the combustion chamber hole of a generic cylinder head gasket known from the prior art may be seen in FIG. 2. The combustion chamber hole is located on the right hand side of the drawing. The left hand side of the drawing shows the transition into the metallic flat gasket. In the built-in condition, the cylinder head continues above the shown gasket, and the cylinder block continues below. This orientation continuously applies to all FIGS. 2 to 13. Similarly, the reference numbers used in FIGS. 1 and 2 are used in the subsequent FIGS. 3 to 13 as far as parts corresponding to the gasket parts shown in FIGS. 1 and 2 are concerned.

The gasket of FIG. 2 contains a compensating plate 4 with an edge portion 4b which is folded back in a direction opposite to the combustion chamber hole. By virtue of the bordering of the edge portion 4b, the compensating means 4a is formed, which is composed of the edge portion 4b and the underlying portion of the compensating plate 4. By virtue of the folding back, the compensating means 4a obtains a greater layer thickness than the portion of the compensating plate 4 located outside the compensating means. The compensating means 4a thus obtained is a non-elastic stopper, since the edge portion 4b is bordered in a way that results in a complete contact with the underlying plate over the entire area of the edge portion 4b.

The gasket further contains two elastic outer plates 5, 6 with edge portions 5a, 6a and a spacer plate 7 with an edge portion 7a onto which the edge portion 4b is folded back. The spacer plate serves to achieve a greater overall constructive height which is necessary when the gasket is used in engines that were constructed in view of the formerly used considerably thicker soft material gaskets.

The edge portions 5a, 6a, 7a of the outer plates or the spacer plate, together with the compensating means 4a, form the compensating area 3 of the gasket laminate. The compensating area 3 is defined in its extension in the direction of the transition into the metallic flat gasket by the end of the edge portion 4b of the compensating plate 4 or by the end of the compensating means 4a located in this direction. It is characterized in that the sum of the thicknesses of the plates of the laminate in this area is greater than in the remaining portion of the laminate. In the built-in condition, the compensating area forms a first non-elastic sealing line.

The elastic outer plates 5, 6 have beads 15, 16 that are located outside the compensating area 3, however adjacent to this area. In the built-in condition, the beads form a second elastic sealing line and are prevented from complete flattening, and thus from a loss of their elasticity, by the non-elastic stopper or compensating area.

Figure 3:
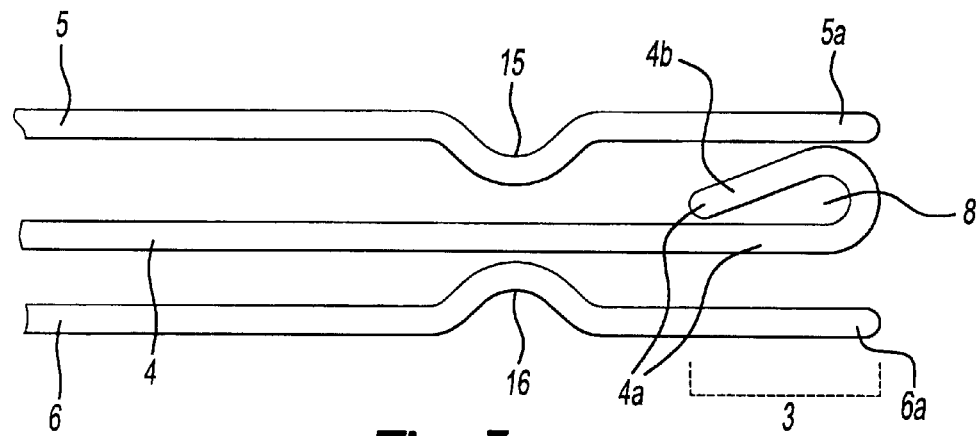
FIGS. 3 to 9 show cross-sections of preferred gaskets according to the present invention.

FIG. 3 shows a preferred gasket according to the present invention consisting of a laminate of two elastic outer plates 5, 6 having beads 15, 16 and a compensating plate 4. The edge portion 4b of the compensating plate 4 is bordered in the direction opposite to the combustion chamber hole and, together with the portion of the compensating plate 4 onto which it is folded back, provides a compensating means 4a that forms a compensating area 3 together with the edge portions 5a, 6a of the elastic outer plates 5, 6.

The bordering is made in such a way that the edge portion 4b is not in contact with the underlying portion of the compensating plate 4. The edge portion 4b, together with the underlying portion of the compensating plate 4, forms an α-shaped cavity 8 by which the compensating means 4a gains elasticity.

Accordingly, the gasket of FIG. 3 comprises an elastic compensating area 3 as well as an elastic sealing area in the area of the beads 15, 16 of the outer plates 5, 6. The elastic compensating area 3 prevents the beads 15, 16 from complete flattening in the built-in condition and at the same time provides better protection of the beads from exposure to combustion gases during engine operation by forming a first sealing line which is elastic itself. This is obtained with a gasket having a relatively low number of parts.

In the gaskets according to the present invention, one of the two outer plates 5, 6 may also be omitted. For instance, omitting one of the two outer plates 5, 6 in the gasket of FIG. 3 leads to a further reduction of parts which results in a gasket of even more simple construction that nevertheless shows a satisfying sealing effect.

In the case of the gaskets shown in FIGS. 4–9 and 12 the location of the compensating area 3 is no longer explicitly indicated. However, it is determined in a manner analogous to what is shown in FIGS. 2 and 3 or explained by the above definitions.

Figure 4:
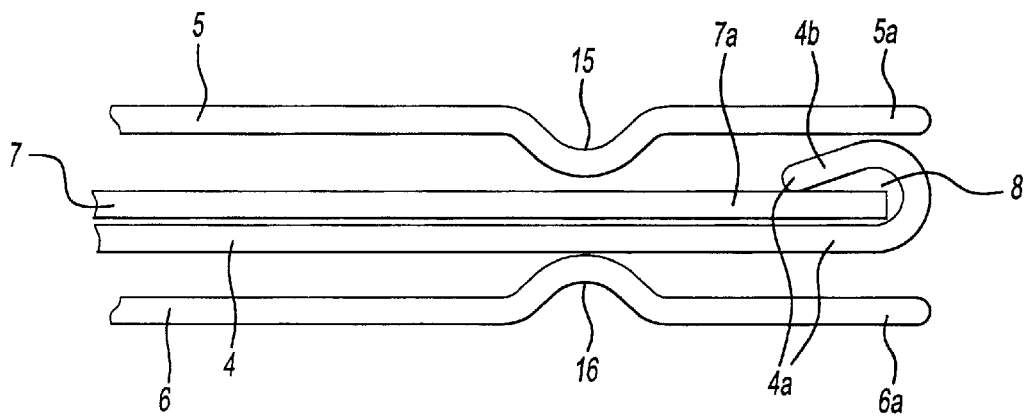

The gasket of FIG. 4 corresponds essentially to the gasket shown in FIG. 3. However, it comprises within the laminate between the outer plate 5 located adjacent to the cylinder head and the outer plate 4 an additional spacer plate 7 for gaining thickness. The spacer plate 7 takes part in the formation of the compensating area with its edge portion 7a. The bordered edge portion 4b of the compensating plate is folded back onto the spacer plate 7 and is in contact with it with its edge. The spacer plate 7 projects with its edge portion 7a into the α-shaped cavity 8 formed by the bordering of the edge portion 4b.

Figure 5:
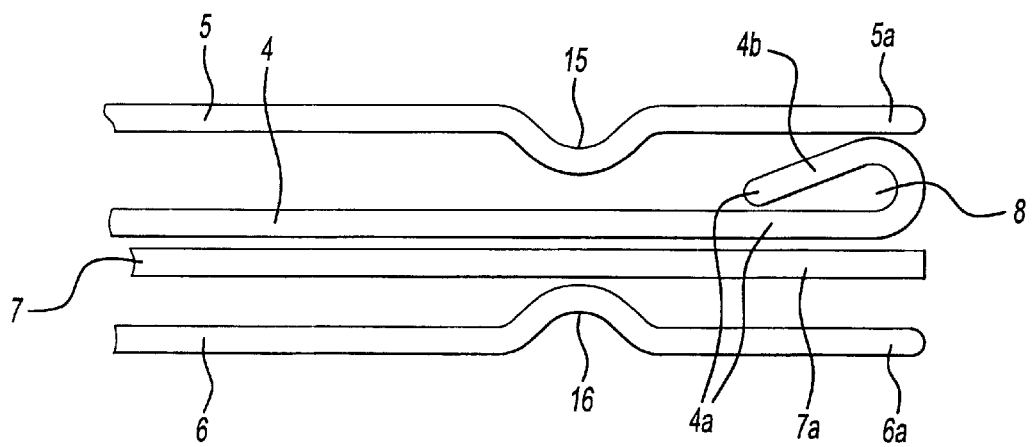

The gasket of FIG. 5 corresponds substantially to the gasket shown in FIG. 4. The spacer plate 7 again takes part in the formation of the compensating area with its edge portion 7a. However, in the case of this gasket the spacer plate is arranged between the outer plate 6, which is adjacent to the cylinder block, and the compensating plate 4. Furthermore, the edge portion 4b is not folded back onto the edge portion 7a of the spacer plate 7 but onto the compensating plate 4. The desired formation of thickness, which is achieved by introducing the spacer plate 7 into the gasket laminate, may also be achieved by using several spacer plates. Thus, it is possible, for instance, to use several spacer plates 7 in the gaskets shown in FIGS. 4 and 5. If very large differences in overall constructive height are intended to be leveled by the introduction of several spacer plates, it is preferred to introduce the additional plates into the laminate in the manner shown in FIG. 5, i.e., the spacer plates do not project with their edge portion 7a into the α-shaped cavity 8. In this case, the additional spacer plates may also be arranged in such a way that they are, with their edge portion 7a, in contact with the edge portion 4a of the compensating plate.

Figure 6:
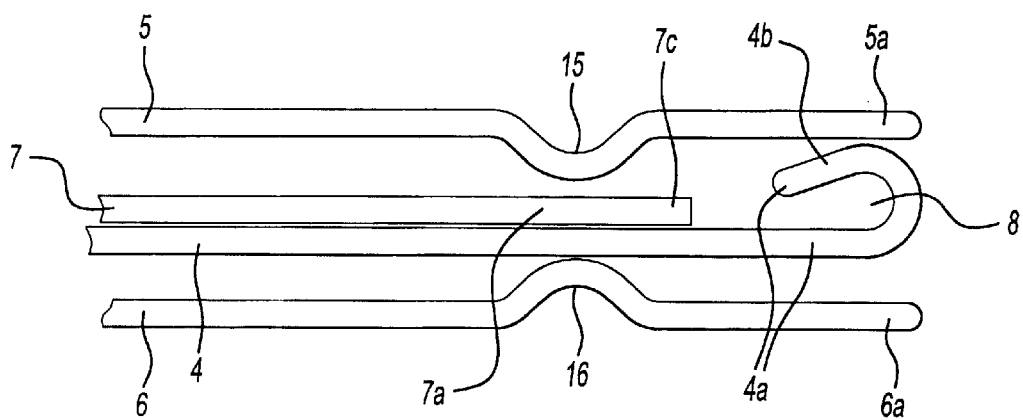

FIG. 6 shows a gasket according to the present invention in which the edge portion 7a of the spacer plate 7 lies outside the compensating area of the laminate, but is located with its edge 7c between the compensating area and the elastic sealing area formed by the beads 15, 16. Thus, in this embodiment not all sheet metal plates of the laminate take part in the formation of the compensating area. In this case, the sheet thickness of the spacer plate 7 is chosen smaller than that of the compensating plate 4 so that by the bordering of the edge portion 4b the sum of the thickness of the different sheet layers in the compensating area is greater than in the remaining part of the laminate. The sheet thickness of the spacer plate 7 may be very small, or may be close to the sheet thickness of the compensating plate 4. By choosing the sheet thickness of the spacer plate 7 from a range from close to zero up to close to the sheet thickness of the compensating plate 4, the flattening of the beads 15, 16 may be varied as needed in the built-in condition of the gasket, and at strong pressing conditions. The gasket according to FIG. 6 may be provided with additional spacer plates in a manner analogous to what was described above for achieving additional thickness.

Figure 7:
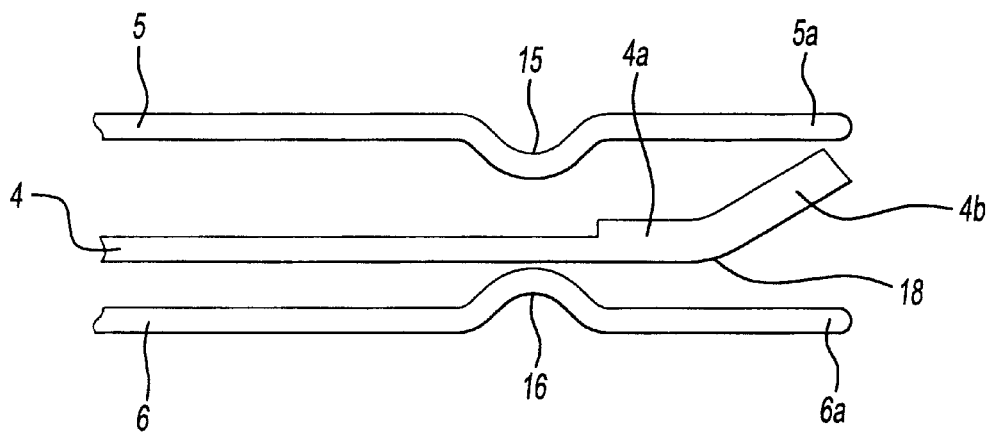

FIG. 7 shows a gasket according to the present invention in which the compensating means 4a is formed by an enlargement of the edge portion 4b of the compensating plate 4. In the case shown, the enlargement is obtained by stamping the compensating plate 4. The compensating plate is provided with an edging 18 in the area of the enlargement, or in the compensating area. The edging 18 provides the desired elasticity in the compensating area of the gasket. The elasticity could also be provided by introducing a bead into the enlarged edge portion 4b.

Figure 8:
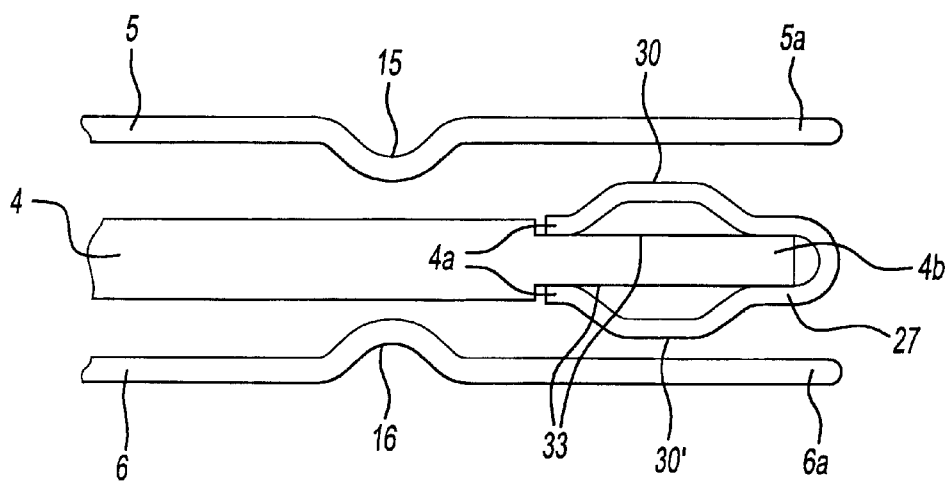

FIG. 8 shows a gasket in which the compensating means 4a is formed by a metal shim 27. The metal shim is an annular elastic flanged plate that is bordered around the edge portion 4b of the compensating plate 4. The compensating plate 4 contains recesses 33 in the contact area of the metal shim and the edge portion 4b. The depth of the recesses 33 and the sheet thickness of the metal shim 27 are chosen in such a way that the layer thickness of the compensating means is greater than that of the portion of the compensating plate 4 not located within the compensating area. The flanged sheet is provided with beads 30, 30' on the side facing towards the cylinder head and on the side facing towards the cylinder block, respectively, the verteces thereof being arranged opposite to each other. The beads 30, 30' provide the desired elasticity within the compensating area of the laminate.

Figure 9:
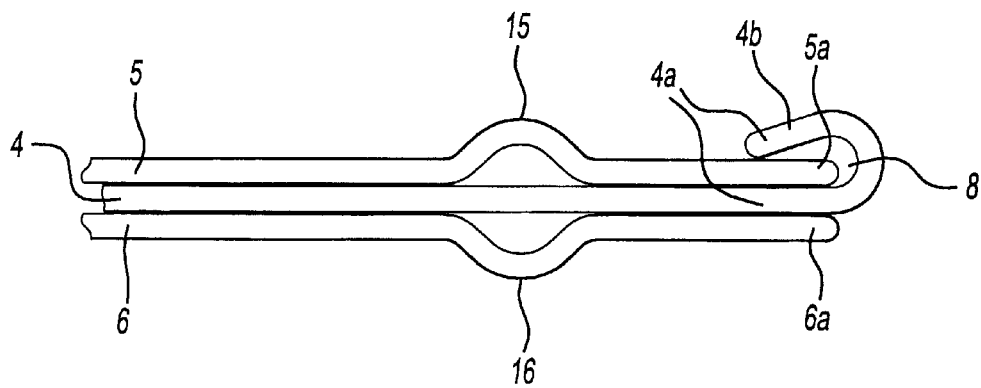

FIG. 9 shows a gasket according to the present invention in which the edge portion 5a of the elastic outer plate 5 is covered towards the cylinder head by the bordered edge portion 4b of the compensating plate 4. In this case, the edge portion 5a of the outer plate extends into the α-shaped cavity 8. Starting from this embodiment, a gasket in which the edge portion 4b is bordered around the edge portion 6a of the outer plate 6 and covers the edge portion 6a towards the cylinder block would also be suitable. In the gasket of FIG. 9, the beads 15, 16 of the outer plates are arranged in such a way that their verteces are in contact with the cylinder head and the cylinder block, respectively. The gasket shown has a relatively low number of parts. By omitting the outer plate 6, the construction may be further simplified while obtaining a gasket with satisfying sealing properties.

FIGS. 10 and 11 show examples of further possible embodiments of compensating plates with bordered edge portions 4b for use in the gaskets according to the present invention, such as the gaskets shown in FIGS. 3 to 8 or 12.

Figure 10A:
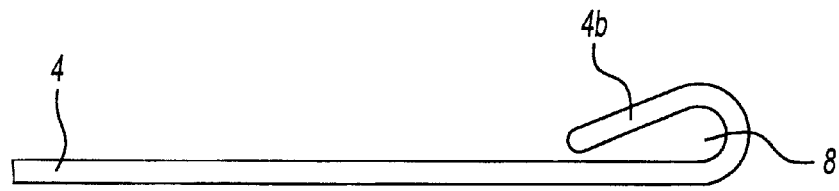
FIGS. 10 and 11 show suitable compensating plates for use in the preferred gaskets.
Figure 10A:
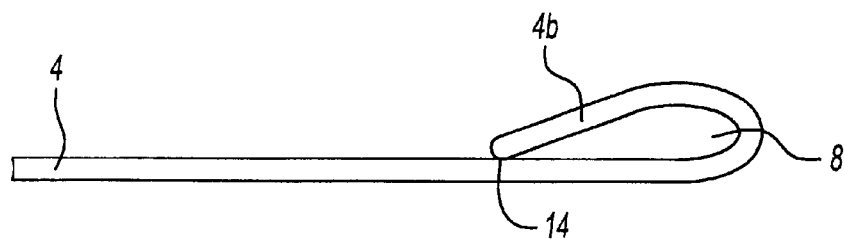

FIG. 10A shows a compensating plate 4 corresponding to the compensating plates shown in FIGS. 3 to 9 or 12. FIG. 10A' shows an embodiment of this compensating plate, in which the edge 14 of the edge portion 4b is in contact with the portion of the compensating plate 4 onto which the edge portion 4b is folded back.

Figure 10B:
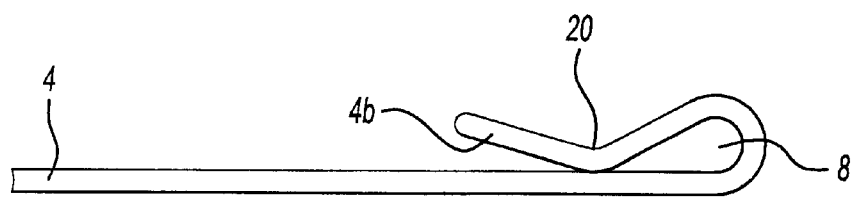

FIG. 10B shows a compensating plate in which the edge portion 4b is additionally provided with a V-shaped bead 20 which is obtained by edging of the bordered edge portion 4b according to FIGS. 10A and 10A'. The vertex of the bead 20 is in contact with the underlying portion of the compensating plate.

Figure 10C:
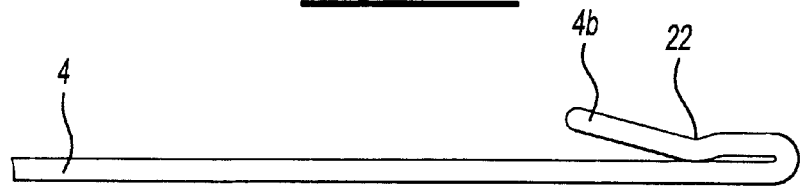

FIG. 10C shows a compensating plate in which the portion of the edge portion 4b facing towards the combustion chamber hole is in complete contact with the underlying portion of the compensating plate. The edge portion 4b has furthermore an edging 22 that results in the portion of the edge portion 4b, which is located in the direction of the transition into the flat gasket, not being in contact with the underlying portion of the compensating plate.

In FIGS. 10D, 10F, 10I, 10L and 10M, the edge portion 4b is arranged in parallel to the underlying portion of the compensating plate 4 due to the bordering. Thus, no portion of the edge portion 4b is in contact with the compensating plate.

Figure 10D:
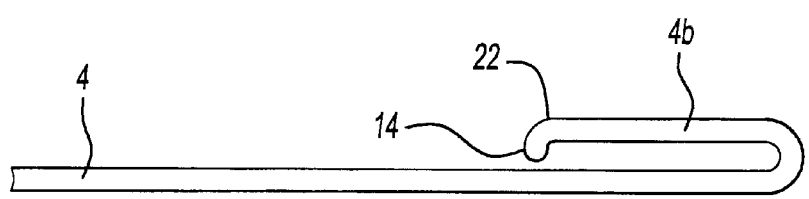

In the compensating plate in FIG. 10D, the part of the edge portion 4b located in the direction of the transition into the flat gasket has an edging 22 by which the edge 14 of the edge portion 4b is folded in the direction of the underlying compensating plate. In this manner, the edge portion 4b is supported after mounting of the gasket.

Figure 10E:
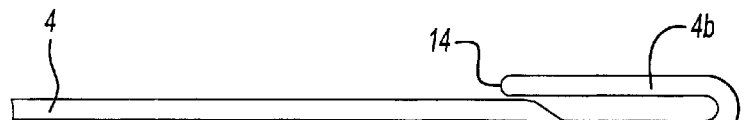
Figure 10F:
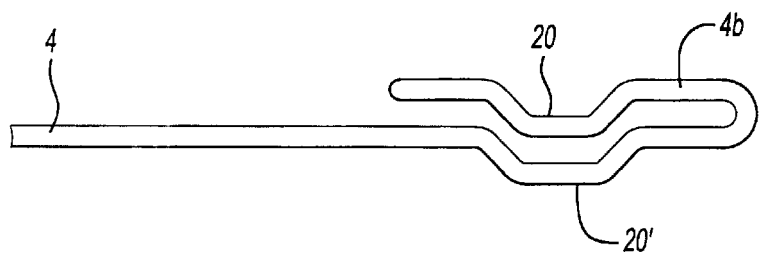

In the compensating plate of FIG. 10F, the legs of the edge portion 4b that are arranged in parallel to each other, and the underlying portion of the compensating plate 4, have beads 20, 20'. The bead 20 points with its vertex into the direction of the compensating plate. The bead 20' points with its vertex into the same direction as the bead 20.

Figure 10G:
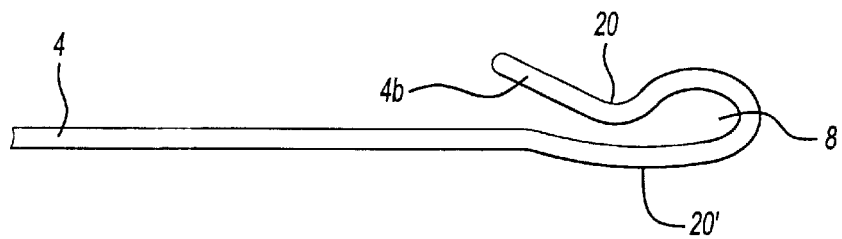
Figure 10H:
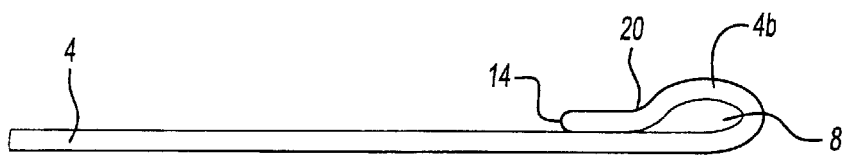
Figure 10H:
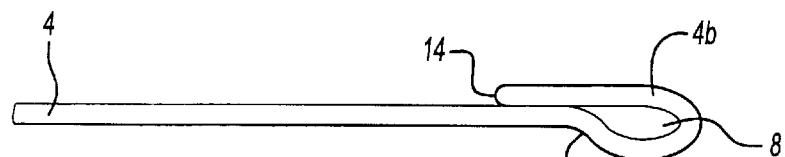
Figure 10I:
Figure 10J:
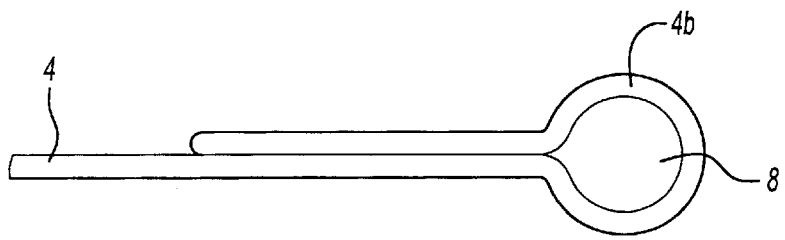
Figure 10K:
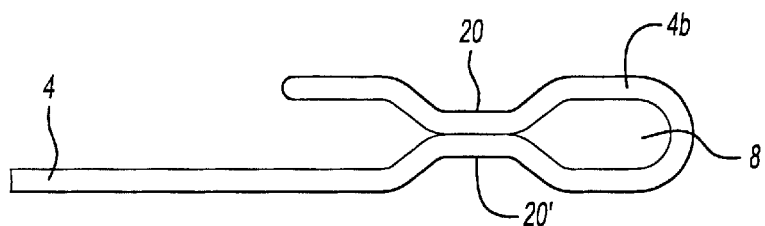
Figure 10L:
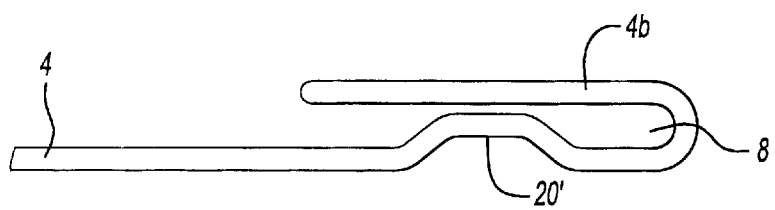

FIG. 10L shows a comparable compensating plate as FIG. 10F. However, the compensating plate of FIG. 10L has only one bead 20' which is located in the portion of the compensating plate underlying the edge portion 4b and points with its vertex into the direction of the edge portion 4b of the compensating plate 4.

Figure 10M:
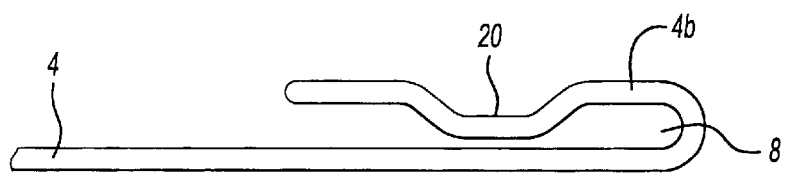

FIG. 10M shows a compensating plate similar to that of FIG. 10L. However, in this case the bead 20 is located within the edge portion 4b that is arranged in parallel to the compensating plate and points with its vertex into the direction of the compensating plate 4.

FIG. 10E shows a compensating plate in which the portion of the compensating plate located within the compensating area is provided with a half-bead 20. The bordered edge portion 4*b* extends in parallel to the compensating plate 4 and is in contact with the compensating plate with its edge 14.

FIG. 10G shows a compensating plate in which the area of the compensating plate onto which the edge portion 4*b* is folded back comprises a shallow U-shaped bead 20', the vertex of which points into the opposite direction in respect of the edge portion 4*b*. The bordered edge portion 4*b* has also a bead 20 which is less shallow than the underlying bead 20', and which points with its vertex into the same direction as the bead 20'. Because of the low degree of flattening of the bead 20, an α-shaped cavity 8 is obtained.

FIG. 10H shows a compensating plate in which the edge portion 4*b* comprises a half-bead 20 pointing towards the compensating plate 4. By the introduction of the half-bead 20, the edge 14 as well as the portion of the edge portion 4*b* located in the direction of the transition into the flat gasket are in contact with the underlying compensating plate. Thus, an α-shaped cavity 8 is formed. In a similar embodiment, shown in FIG. 10H', the half-bead 20 is located in the portion of the compensating plate 4 onto which the edge portion 4*b* is folded back. In this case, the edge portion 4*b*, with the portion located in the direction of the transition into the flat gasket, including the edge 14, is in contact with the underlying compensating plate, and together with it encompasses an α-shaped cavity 8.

FIG. 10J shows a compensating plate in which the portion of the edge portion 4*b*, which is located in the direction of the transition into the flat gasket, is in contact with the underlying compensating plate 4. In the area of the bordering, i.e., in the portion of the edge portion 4*b* located in the direction of the combustion chamber hole, the edge portion 4*b*, together with the underlying portion of the compensating plate 4, forms an α-shaped cavity 8 that is nearly circular.

FIG. 10K shows a compensating plate analogous to FIG. 10F; however, the verteces of the beads 20, 20' are in contact with each other.

Figure 10N:
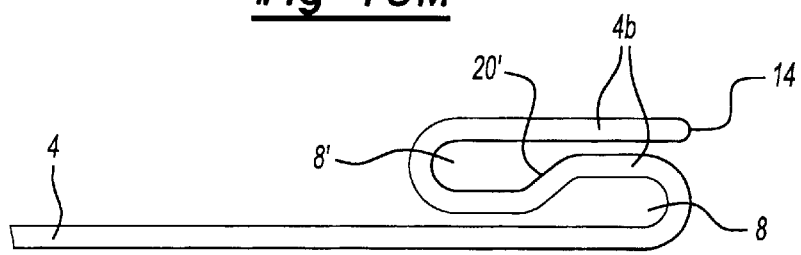

FIG. 10N shows a compensating plate in which the edge portion 4*b* is bordered twice, and therefore, forms an S-structure, the edge 14 of the edge portion 4*b* pointing towards the combustion chamber hole. The intermediate layer of the S-structure comprises a half-bead 20' which is arranged in such a way that in between the intermediate layer and the underlying portion of the compensating plate 4 an α-shaped cavity 8 is formed, and that in between the intermediate layer and the outer portion of the S-structure a further α-shaped cavity 8' is formed.

Figure 10Q:

FIG. 10Q shows a compensating plate in which the edge portion 4*b* is bordered in such a way that the portion of the edge portion located in the direction of the combustion chamber hole has a smaller distance to the underlying portion of the compensating plate 4 than the portion of the edge portion 4*b* located in the direction of the transition into the flat gasket.

Figure 10R:
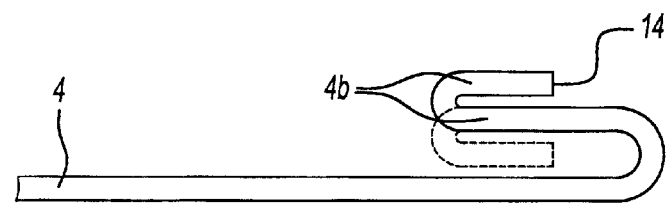

FIG. 10R shows a compensating plate in which, similar to FIG. 10N, the edge portion 4*b* is folded back twice due to a first bordering in the direction away from the combustion chamber hole and a second bordering in the direction towards the combustion chamber hole, thus forming an S-structure, with the edge 14 of the edge portion 4*b* pointing towards the combustion chamber hole. However, in the case of the compensating plate of FIG. 10R the intermediate layer does not have a bead. Rather, the legs of the edge portion 4*b* obtained by the two borderings run parallel to the underlying portion of the compensating plate. Rather than obtaining an S-structure, the second bordering is made in the case of an alternative embodiment of the compensating plate of FIG. 10R in such a way that the folded leg obtained by the second bordering forms the intermediate layer, without however being in contact with the underlying portion of the compensating plate. In both embodiments the folded leg obtained by the second bordering is shorter than the folded leg obtained by the first bordering. In both cases, the inner flanks of the folded legs may be additionally provided with elastic coatings (in the Figure indicated by small crosses).

FIG. 11 shows further embodiments of a compensating plate 4 for use in the gaskets according to the present invention. The edge portion 4*b* of the compensating plates shown in FIGS. 11A and 11B is in complete contact with the underlying portion of the compensating plate 4. The compensating plate of FIG. 11A comprises several V-shaped beads 20, 20' in the edge portion 4*b* as well as in the underlying portion of the compensating plate 4 which are arranged in parallel to each other. In the case of the compensating plate of FIG. 11B, the edge portion 4*b* and the underlying portion of the compensating plate have several U-shaped beads 20, 20' which are likewise arranged in parallel to each other.

Figure 11A:
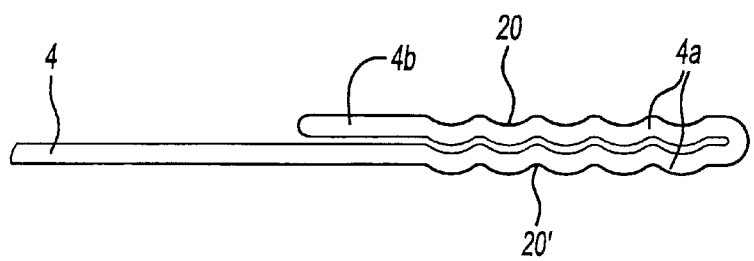
Figure 11B:
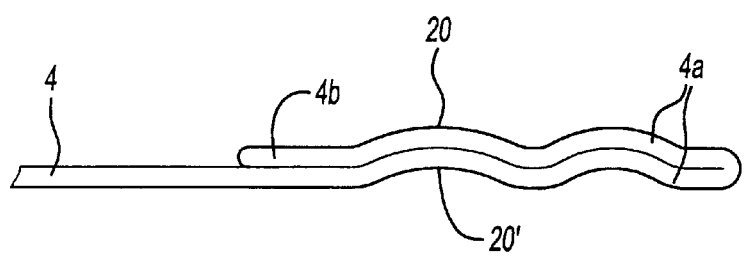
Figure 11C:
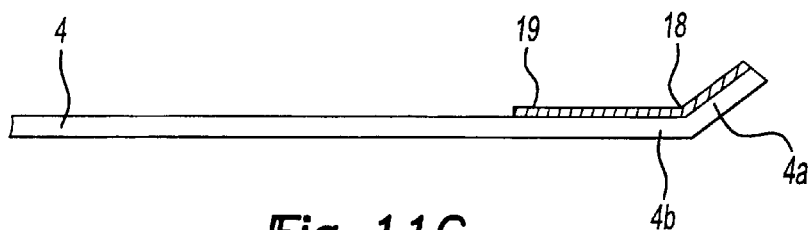

FIG. 11C shows a compensating plate having an enlarged edge portion 4*b*. In this case, the enlargement is achieved by a welded-on metal shim 19, which is in contact with the edge portion 4*b* of the compensating plate with its entire surface. The edge portion 4*b* is additionally provided with an edging 18 that provides the desired elasticity in the compensating area of the laminate.

Figure 11D:
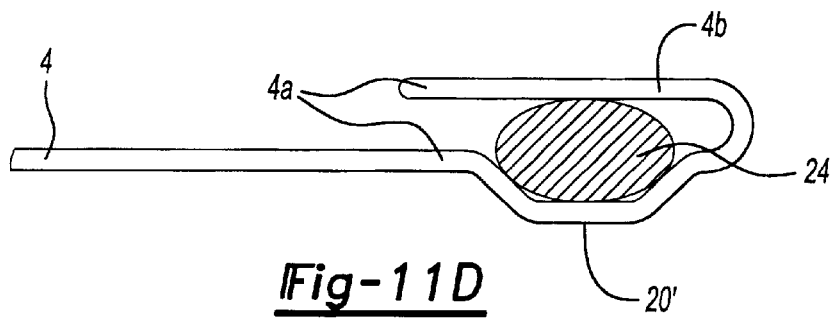

FIG. 11D shows a compensating plate in which the portion of the compensating plate underlying the edge portion 4*b* has a bead 20'. The bordered edge portion 4*b* is arranged in parallel to the compensating plate. Between the edge portion 4*b* and the underlying portion of the compensating plate, an elastic inlay 24 is inserted. This inlay provides additional elasticity in the compensating area of the laminate.

Figure 11E:
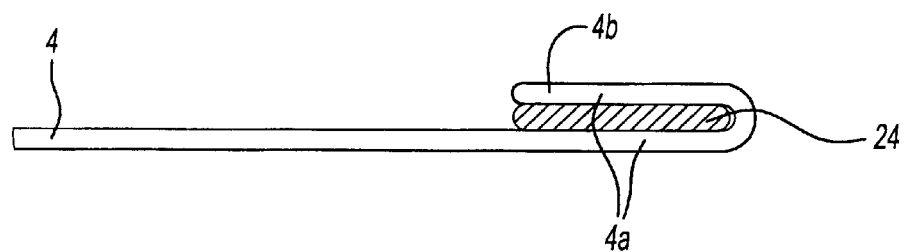
Figure 11E:
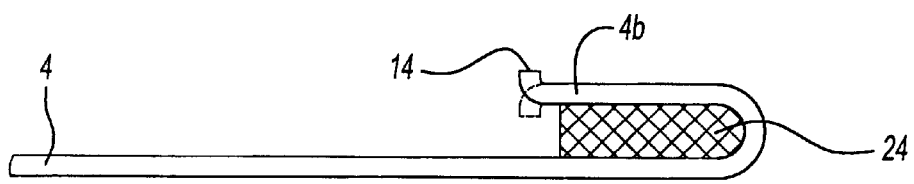

FIG. 11E shows a compensating plate as shown in FIG. 10I. Additionally, this compensating plate has an elastic inlay 24 that is arranged between the edge portion 4*b* and the underlying portion of the compensating plate 4. In the cases of FIG. 11D and 11E, it is not necessarily required that the compensating plate itself has a pronounced elasticity.

FIG. 11E' shows a compensating plate according to FIG. 11E having an elastic inlay. In this case, however, the edge 14 of the edge portion 4*b* of the compensating plate 4 is additionally bent upwards and downwards in a hook-shaped manner, respectively, to prevent the elastic inlay 24 from emerging out of the chamber formed by the edge portion 4*b* and the underlying portion of the compensating plate 4 during fastening of the gasket.

Figure 11F:
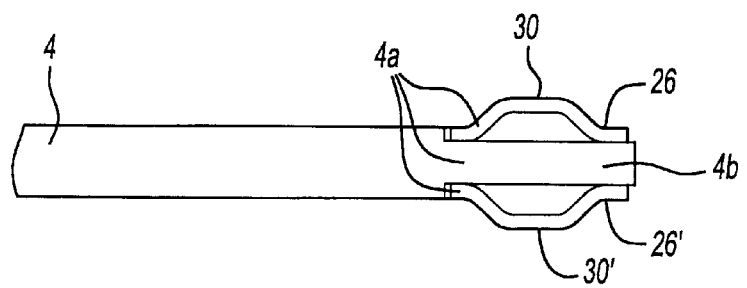

FIG. 11F shows a compensating plate having two elastic metal shims 26, 26' in its edge portion 4*b*. The metal shims are arranged in recesses of the compensating plate similar to what is shown in FIG. 8, the depth of the recesses and the thickness of the metal shims being chosen in such a way that the compensating means 4*a* so formed has a greater layer thickness than the portion of the compensating plate 4 not located within the compensating area. The metal shims 26, 26' are each provided with a bead 30, 30'. The verteces of the beads 30, 30' are arranged opposite to each other.

Figure 11G:
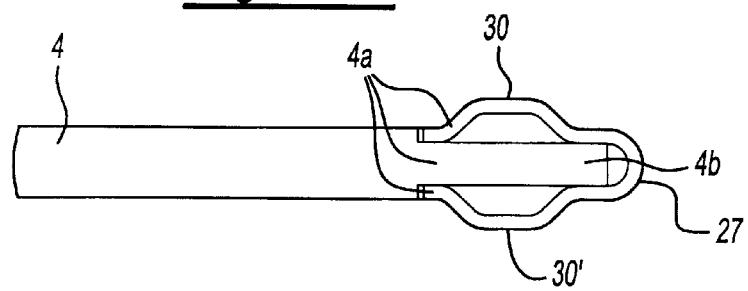

FIG. 11G shows a compensating plate analogous to the compensating plate within the gasket laminate shown in FIG. 8.

Figure 11H:
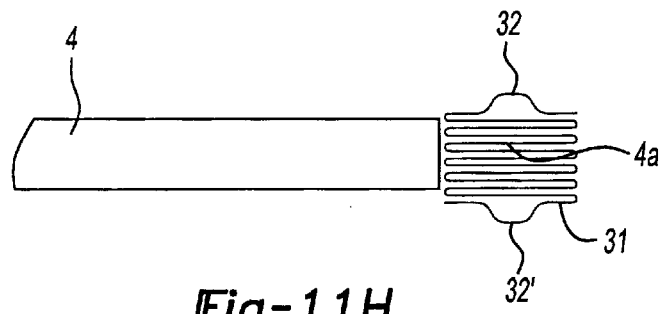
Figure 11H:
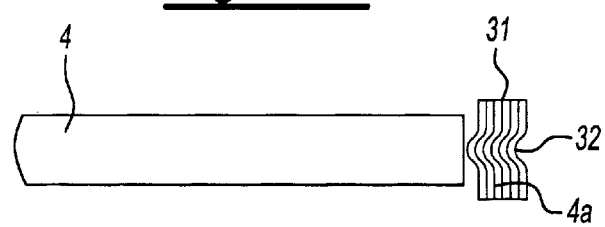

In FIG. 11H a compensating plate provided with an elastic metal shim 31 is shown. The metal shim 31 serves as compensating means, with the compensating plate 4 not taking part in the formation of the compensating means. The elastic metal shim 31 is a spring ring, in this case having the shape of a metal bellow with multiple layers, the sum of the thickness of its different layers being greater than the thickness of the compensating plate. The two outermost layers of the metal bellow 31 each have a bead 32, 32', the verteces thereof pointing into opposite directions. The spring ring 31 is attached to the compensating plate 4 by welding. In gasket laminates according to the present invention, in which the spring ring is arranged between two metal plates of the gasket laminate, a fixation onto the compensating plate, e.g. by welding or soldering, may be omitted.

Similar to FIG. 11H, FIG. 11H' shows a spring ring 31 made of multiple metal layers, in this case being provided with beads 32 pointing into the same direction, the spring ring being attached to a compensating plate 4. The compensating plate does not take part in the formation of the compensating area. The metal layers of the spring ring are arranged perpendicularly to the plane of the compensating plate 4 and together form a compensating means 4a. Also in this case, fixation of the spring ring to the compensating plate may be omitted in suitable gasket laminate constructions.

Figure 11I:
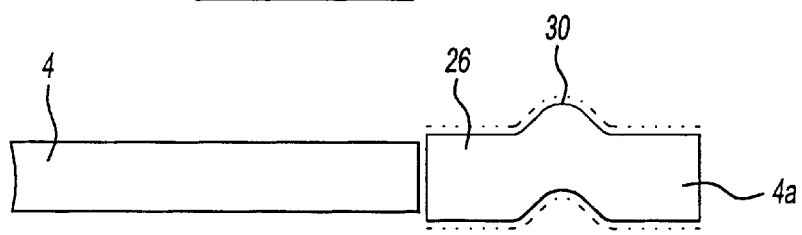
Figure 11J:
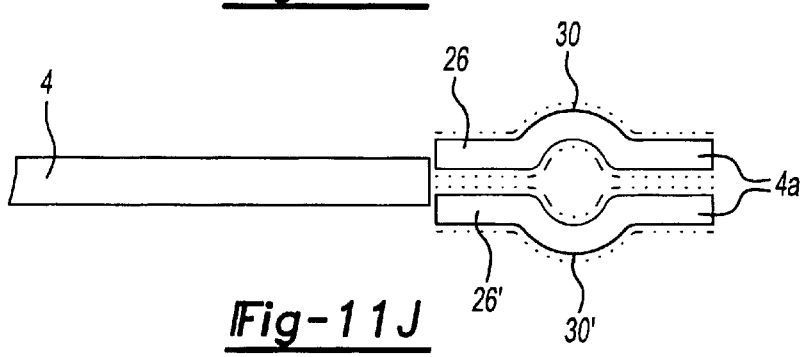

FIGS. 11I and 11J also show compensating plates 4 that do not take part in the formation of the compensating means, in combination with a beaded elastic metal shim 26, or with two beaded elastic metal shims 26, 26' lying on top of each other, where in the latter case the beads 30, 30' point into opposite directions. A fixation of the shims 26, 26' to the compensating plates 4 is not present in the embodiments shown, but may be effected, if necessary. Furthermore, the shims 26, 26' may be provided with an elastic and/or damping coating (indicated by small crosses).

Figure 11K:
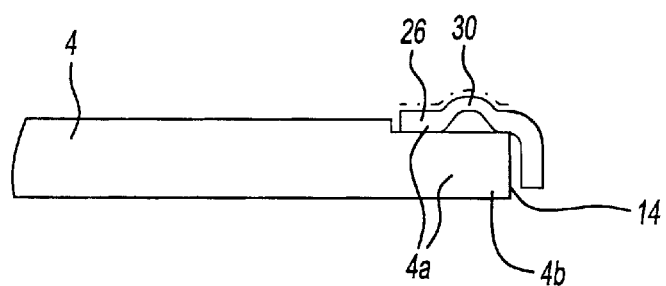

FIG. 11K shows a compensating plate 4 having in a recess of its edge portion 4b an elastic metal shim 26 provided with a bead 30. The edge portion 4b and the metal shim 26 together form the compensating means 4a. The edge of the shim 26 facing towards the combustion chamber hole is bent around the edge 14 of the compensating plate. The shim may optionally be provided with an elastic coating on its side located opposite to the recess (shown by small crosses).

Figure 11L:

FIG. 11L shows a compensating plate 4, the edge portion 4b of which includes an elastic inlay 24, similar to the compensating plates of FIGS. 11D, 11E and 11E'. However, the bordering of the edge portion is in this case done in such a way that the inlay 24 is entirely surrounded.

In FIG. 12 different embodiments of spacer plates 34, 35, 37 are shown which are provided with elastic, plastic or plastic-elastic means in their edge portion 34a, 35a, 37a. According to the present invention, the elastic, plastic or plastic-elastic means that are located in the edge portion 34a, 35a, 37a of the spacer plates 34, 35, 37, are preferably arranged within the compensating area of the gasket laminate. They may also be arranged in a preferable manner in the area of the transition of the compensating area into the flat gasket, or may extend starting from the compensating area into this area. A preferred gasket may also be obtained, wherein the elastic means are located within the edge portion 34a, 35a, 37a of the compensating plate 34, 35, 37 in the area between the compensating area and the second elastic sealing area formed by the beads 15, 16 of the outer plates 5, 6. However, it is advantageous when the elastic means are not located within the second elastic sealing area formed by the beads 15, 16 of the elastic outer plates.

Figure 12A:
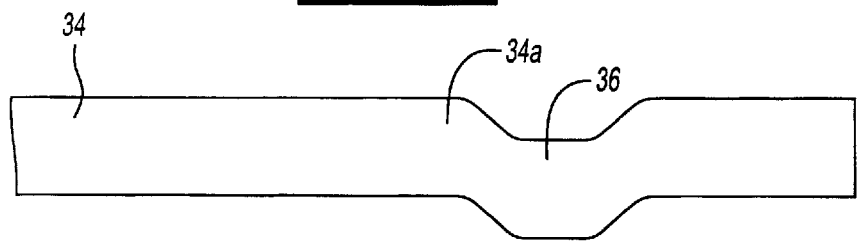
FIG. 12 shows elastically, plastically or plastically-elastically deformable spacer plates which may be introduced into the laminates of the gaskets according to the present invention.

FIG. 12A shows a spacer plate 34 having a bridge-like bead 36 in its edge portion 34a.

Figure 12B:
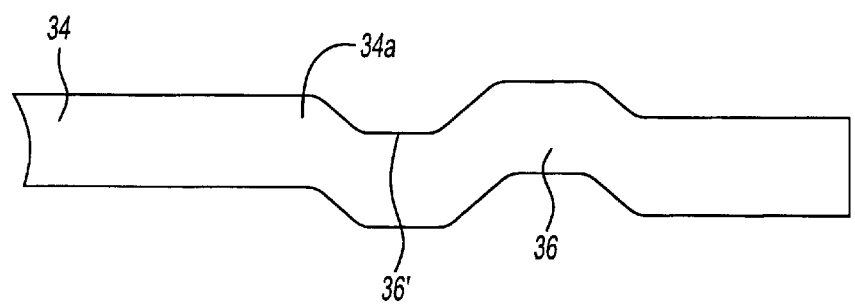

FIG. 12B shows a spacer plate 34 which is provided with two bridge-like beads 36, 36' in its edge portion 34a. The verteces of the two bridge-like beads point into opposite directions.

Figure 12C:
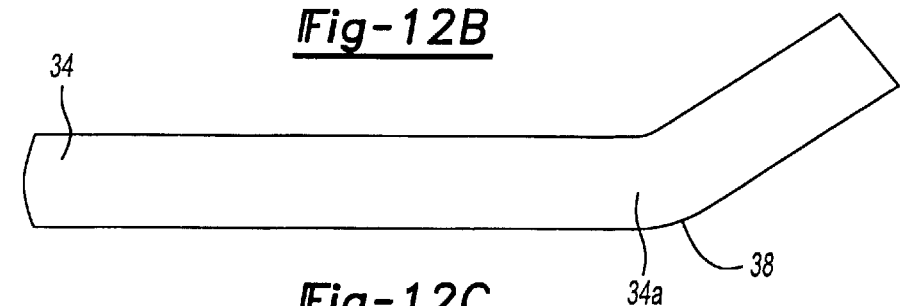

In FIG. 12C a spacer plate 34 is shown having an edging 38 in its edge portion 34a to enhance the elasticity within the compensating area of the laminate.

Figure 12D:
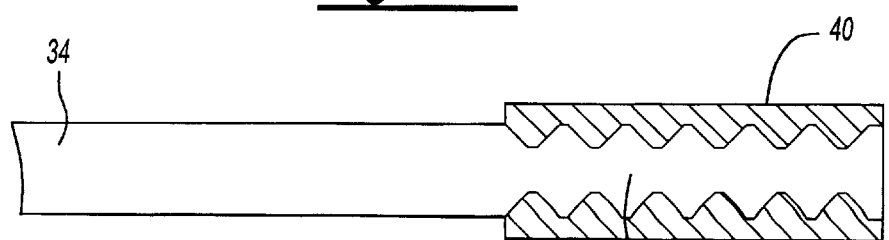
Figure 12E:
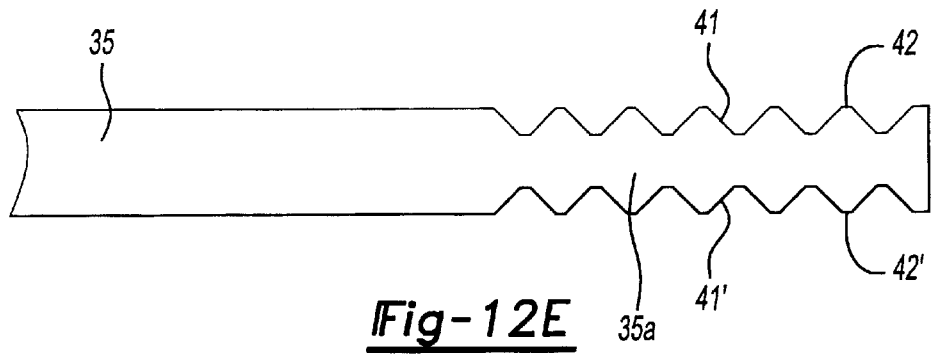

In FIG. 12E a spacer plate 35 is shown that has an undulating profile with prominent elevations in its edge portion 35a which extends into the compensating area, the undulating profile being formed as V-shaped grooves 41, 41' in the embodiment shown. The V-shaped grooves are arranged next to each other in such a way that prominent tips 42, 42' are built up on the sides of the spacer plate 35 opposite to each other, with the distance of these tips to the tips being located on the opposite side of the spacer plate 35 being greater than the plate thickness in the portion of the spacer plate 35 located outside the edge portion 35a. Depending on the material selected for the spacer plate 35, the formation of the tips 42, 42' results in a plastic or plastic-elastic deformation of the spacer plate within the compensating area of the gasket during mounting of a gasket containing the spacer plate 35.

In FIG. 12D a spacer plate 34 is shown that corresponds to the spacer plate 35 in respect of the formation of the V-shaped grooves with elevated tips in its edge portion 34a. Additionally, an elastic material is applied in the area of the V-shaped grooves which enhances the elasticity within the compensating area of the laminate.

Figure 12F:
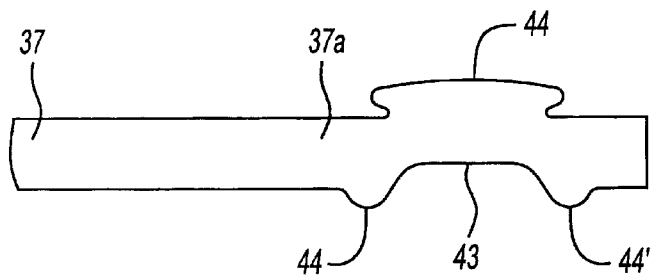
Figure 12G:
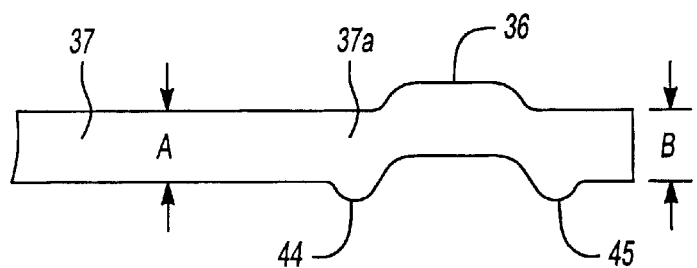

FIGS. 12F and 12G show spacer plates 37 having beads 43, 36 in their edge portion 37a, wherein the beads provide elasticity to the edge portion. At the same time, the beads are provided with plastically deformable means 44, 44', 45. In the case of the spacer plate according to FIG. 12F, the bases are formed on the side of the spacer plate opposite to the vertex of the bead as projecting, plastically deformable elevations or bulbs 44, 44'. On the side of the spacer plate pointing towards the vertex of the bead, such plastically deformable bulb 44 is also present. The vertex of the bead on this side of the spacer plate takes part in the formation of this bulb.

In the case of the spacer plate according to FIG. 12G, the edge portion 37a of the spacer plate has an upsetting within the area of the bead 36. The upsetting results in a thickness or sheet thickness b of the spacer plate within the area of the bead 36 that is greater than the thickness or sheet thickness a of the spacer plate outside the edge portion 37a. A plastically deformable bulb 44 is present at the lower side of the bead at its base located distally from the combustion chamber hole, while the lower side base located on the side of the combustion chamber hole has a plastically deformable enlargement 45.

Also preferred in the gaskets according to the present invention are spacer plates having only plastically deformable means within their edge portion, e.g. the above-mentioned bulbs and enlargements, and showing substantially no elastic deformability within the edge portion.

The apertures of the beads of the embodiments shown as examples in FIGS. 11F, 11G, 11H, 11I, 11J, 11K, 12A, 12B, 12F and 12G may, if necessary, also partly or entirely be provided with a filling material promoting the elasticity.

The spacer plates 34, 35, 37 shown in FIGS. 12D, 12E, 12F and 12G may also be used as compensating plates in the gaskets according to the present invention. Such gaskets may be made, for instance, of beaded outer plates 5, 6 and a plate as shown in FIGS. 12D, 12E, 12F and 12G, the plate according to FIGS. 12D, 12E, 12F and 12G having the function of the compensating plate. Spacer plates may be used in addition. In this way, a gasket of simple construction will be obtained.

Figure 13:
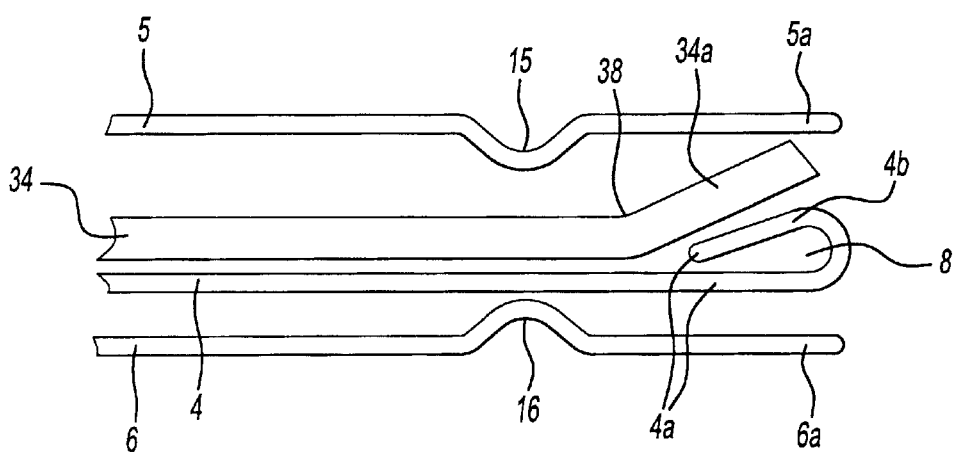
FIG. 13 shows a cross-section of a further preferred embodiment of a gasket according to the present invention.

FIG. 13 shows how the spacer plates 34, 35, 37 of FIG. 12 may be introduced into a gasket laminate according to the present invention. In the particular case shown, it is a spacer plate 34 having an edging 38 within the area between the area of the beads 15, 16 and the compensating area of the gasket. Due to the edging 38, additional elasticity is provided within the compensating area of the gasket. In the case of the gasket of FIG. 13, the spacer plate 34 is arranged between the outer plate 5 lying adjacent to the cylinder head and the compensating plate 4. However, the spacer plates 34, 35 may also be arranged between the compensating plate 4 and the outer plate 6 arranged adjacent to the cylinder block.

What is claimed is:

1. A gasket suitable for use in connection with a cylinder head, the gasket having a combustion chamber aperture with a central axis, the gasket further including:

a first outer plate including a first compensating portion having an edge portion positioned within said first compensating portion;

a second outer plate including a second compensating portion having an edge portion positioned within said second compensating portion; and a compensating plate positioned between said first and second outer plates, said compensating plate including a compensating element having an elastic element and an edge portion;

wherein the area between the compensating portions of said first and second outer plates defines a compensating area and said compensating element is positioned within said compensating area, and wherein at least one of said first and second outer plates includes a bead positioned outside of, and in close proximity to, said compensating portion of said plate.

2. A gasket as recited in claim 1, wherein said gasket includes a spacer plate positioned between said first and second outer plates and adjacent to said compensating plate.

3. A gasket as recited in claim 2, wherein a portion of said spacer plate is positioned within said elastic element formed by said compensating element.

4. A gasket as recited in claim 2, wherein said elastic element includes a formation selected from the group consisting of a bead and an edging.

5. A gasket as recited in claim 2, wherein said spacer plate is comprised of an elastic material.

6. A gasket as recited in claim 2, wherein said spacer plate includes a plastically deformable element.

7. A gasket as recited in claim 1, wherein, when taken in the direction parallel to the central axis of the aperture, the combined layer thickness of the components of the gasket in said compensating area is greater than the combined layer thickness of the components of said gasket outside of said compensating area.

8. A gasket as recited in claim 1, wherein said edge portion of said compensating element is folded back and does not contact another portion of said compensating plate.

9. A gasket as recited in claim 8, wherein said folded back edge portion of said compensating element forms a generally α-shaped cavity with respect to the remainder of said compensating plate.

10. A gasket as recited in claim 8, wherein said folded back edge portion of said compensating plate includes an inlay comprised of an elastic sealing material.

11. A gasket as recited in claim 1, wherein said compensating plate is comprised of an elastic material.

12. A gasket as recited in claim 1, wherein said compensating element includes a structural formation selected from the group consisting of a bead and edging.

13. A gasket as recited in claim 1, wherein said compensating element is formed by an enlargement of said edge portion of said compensating plate within the compensating area, and said elastic element is formed in said enlarged edge portion.

14. A gasket as recited in claim 13, wherein said edge portion is provided with a formation selected from the group consisting of a bead and an edging.

15. A gasket as recited in claim 1, wherein said compensating element is formed by a metal shim and the elastic element of said compensating element is formed in said metal shim.

16. A gasket as recited in claim 15, wherein said elastic element is made of an elastic material and includes at least one bead.

17. A gasket as recited in claim 1, wherein said compensating element is separate from said compensating plate and is connected to said compensating plate during manufacture of said gasket.

18. A gasket as recited in claim 1, wherein said elastic element includes a layer of elastomeric sealing material.

19. A gasket as recited in claim 1, wherein said elastic element includes a plastically deformable element.

20. A gasket suitable for use in connection with a cylinder head, the gasket having a combustion chamber aperture with a central axis, the gasket further including:

a first outer plate including a first compensating portion having an edge portion positioned within said first compensating portion;

a second outer plate including a second compensating portion having an edge portion positioned within said second compensating portion; and a compensating plate positioned between said first and second outer plates, said compensating plate including a compensating element having an elastic element and an edge portion;

wherein said gasket includes a spacer plate positioned between said first and second outer plates and adjacent to said compensating plate, wherein the area between the compensating portions of said first and second outer plates defines a compensating area and said compensating element is positioned within said compensating area, wherein, when taken in the direction parallel to the central axis of the aperture, the combined layer thickness of the components of the gasket in said compensating area is greater than the combined layer thickness of the components of said gasket outside of said compensating area, and wherein at least one of said first and second outer plates includes a bead positioned outside of, and in close proximity to, said compensating portion of said plate.

* * * * *